United States Patent
Dakhil

(10) Patent No.: US 9,732,967 B2
(45) Date of Patent: Aug. 15, 2017

(54) WIND TURBINE AND AIR CONDITIONING APPARATUS, METHOD AND SYSTEM

(71) Applicant: Farouk Dakhil, Rome (IT)

(72) Inventor: Farouk Dakhil, Rome (IT)

( * ) Notice: Subject to any disclaimer, the term of this patent is extended or adjusted under 35 U.S.C. 154(b) by 515 days.

(21) Appl. No.: 14/454,871

(22) Filed: Aug. 8, 2014

(65) Prior Publication Data
US 2016/0040656 A1    Feb. 11, 2016

(51) Int. Cl.
| | | |
|---|---|---|
| F24D 11/02 | (2006.01) | |
| F03D 1/02 | (2006.01) | |
| F03D 13/20 | (2016.01) | |
| F03D 9/25 | (2016.01) | |

(52) U.S. Cl.
CPC .............. *F24D 11/02* (2013.01); *F03D 1/02* (2013.01); *F03D 9/25* (2016.05); *F03D 13/20* (2016.05); F05B 2240/922 (2013.01); F24D 2200/12 (2013.01); Y02B 10/30 (2013.01); Y02B 10/70 (2013.01); Y02B 30/126 (2013.01); Y02E 10/725 (2013.01); Y02E 10/728 (2013.01)

(58) Field of Classification Search
CPC .......... F05B 2240/917; F05B 2240/921; F05B 2240/922; Y02E 10/70; Y02E 10/725; Y02E 10/728; B64B 1/00; B64B 1/06; B64B 1/08; B64B 1/20; B64B 1/50; B64B 1/62; B64B 1/66; F03D 13/20; F03D 5/00; F03D 9/002
USPC .............. 290/44, 55; 244/30, 33; 307/43, 72
See application file for complete search history.

(56) References Cited

U.S. PATENT DOCUMENTS

| | | | | |
|---|---|---|---|---|
| 4,450,364 | A * | 5/1984 | Benoit ................... | F03D 13/20 244/25 |
| 7,582,981 | B1* | 9/2009 | Meller ................... | F03D 1/025 290/44 |
| 2006/0168961 | A1* | 8/2006 | Alekseevich .......... | F03D 9/007 60/641.8 |
| 2007/0234749 | A1* | 10/2007 | Enis ......................... | C02F 1/22 62/238.2 |
| 2008/0116315 | A1* | 5/2008 | Hamburg ................. | B64B 1/50 244/30 |
| 2008/0289793 | A1* | 11/2008 | Geiken ................... | F24J 2/4649 165/10 |
| 2009/0175603 | A1* | 7/2009 | Gode ..................... | F24D 11/002 392/346 |
| 2010/0117363 | A1* | 5/2010 | Meller .................... | F03D 1/025 290/52 |
| 2010/0140390 | A1* | 6/2010 | Goodall ................... | B64B 1/00 244/30 |
| 2011/0192938 | A1* | 8/2011 | DiMarzio ................ | B64B 1/00 244/53 R |

(Continued)

Primary Examiner — Thienvu Tran
Assistant Examiner — David M Stables
(74) Attorney, Agent, or Firm — Maier & Maier, PLLC

(57) ABSTRACT

A system for using solar and wind energy for electricity generation and thermal regulation. The system may include a high altitude wind turbine, which may generate electric power and conduct cold to the ground and the rest of the system. The cold may be conducted to a crystallization tank, which may also include an input for heat, for example from solar energy. Cold and heat from the crystallization tank may then be stored or used to heat or cool one or more buildings. Generated electric power may be used in conjunction with or separately from the heating/cooling system.

18 Claims, 13 Drawing Sheets

(56) References Cited

U.S. PATENT DOCUMENTS

| | | | | |
|---|---|---|---|---|
| 2012/0031119 A1* | 2/2012 | Ahmad | ............... | B64B 1/50 |
| | | | | 62/79 |
| 2012/0235410 A1* | 9/2012 | Serrano | ............... | B64B 1/50 |
| | | | | 290/50 |
| 2012/0319407 A1* | 12/2012 | Glass | ............... | F03D 1/04 |
| | | | | 290/55 |
| 2013/0119188 A1* | 5/2013 | Ciampa | ............... | B64B 1/62 |
| | | | | 244/30 |
| 2013/0285385 A1* | 10/2013 | Zohar | ............... | F03D 9/00 |
| | | | | 290/55 |
| 2014/0374537 A1* | 12/2014 | Anderson | ............... | B64B 1/50 |
| | | | | 244/1 A |
| 2014/0377066 A1* | 12/2014 | Anderson | ............... | F03D 1/065 |
| | | | | 416/44 |

\* cited by examiner

WIND TURBINE AND AIR CONDITIONING APPARATUS, METHOD AND SYSTEM

BACKGROUND

Over the past century, there have been many improvements in the development of clean energy, including a growing ability to harness hydropower, wind power, and solar power. However, power installations that make use of clean energy are typically located at a distance from the major population centers where the electricity is needed. While hydropower generally must be utilized at fixed locations (usually away from urban centers and high-population areas), there are fewer such technical restrictions limiting the use of wind and solar power installations in higher-population areas. Instead, the barriers to constructing these installations have often been political. For example, there have been protests against the installation of wind farms near homes and farms, essentially saying "not in my backyard," forcing these power plants farther away. Because of this, the transportation required to move electric power from the generation plants to homes and businesses entails a large loss of power, typically to heat, over the course of the distance the electricity has to travel.

There is a need for generating electric power in loco, thereby eliminating much of the loss of power. However, the manner of generating such power cannot be overly intrusive; a conventional wind farm in a neighbor's backyard could be seen as undesirable by others in the neighborhood. A comprehensive solution has yet to be found. Even when relatively low-aesthetic impact home-mounted solar cells are used, their inefficiency does not allow them to fully power the building to which they are affixed year-round unless a specific set of conditions are met. In particular, the air conditioning needs in hot climates can easily require more energy than is available through a roof-mounted solar cell.

SUMMARY

According to at least one exemplary embodiment, a method, system, and apparatus for using solar and wind energy for electricity generation and thermal regulation may be shown and described. A high-altitude wind turbine may be utilized for such electricity generation. The high-altitude wind turbine can have a substantially rigid shell; a chamber suitable for retaining a sufficient quantity of lighter-than-air gas to lift the high-altitude wind turbine off of the ground when substantially filled with said lighter-than-air gas; and at least one wind turbine that generates a quantity of electrical power when spun by an airflow.

In a further exemplary embodiment, a system for using solar and wind energy for thermal regulation may include at least one solar collector; at least one crystallization tank operationally linked to both the at least one high-altitude wind turbine and the at least one solar collector; and at least one heat pump configured to conduct heat between the at least one crystallization tank and another environment.

In still another exemplary embodiment, a method for using solar and wind energy for thermal regulation may be described. The method can include configuring at least one solar collector to deliver heat to a system; configuring at least one high-altitude wind turbine to deliver cold to a system; using the combination of the at least one solar collector and the at least one high-altitude wind turbine to produce a thermal reservoir at a desired temperature; and using a heat pump to direct heat between the thermal reservoir and an environment to be thermally regulated to bring the environment to be thermally regulated to a desired temperature.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

Exemplary

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, as used herein for the sake of convenience, the phrase "storing cold" may be used to identify a method for deferring the application of a cooling effect. In a non-limiting example, this may refer to the process of employing a cooling effect to change the state or other qualities of a thermal storage system in a manner that allows the thermal storage system to later be employed as a heat sink. Such a system may, for example, "store cold" in the latent heat of ice banks or eutectic salts, allowing the "cold" to be used at a more favorable time later on. Likewise, "cold" may be identified as a transferable physical quantity akin to heat, similarly for convenience.

According to at least one exemplary embodiment, and generally referring to the figures, a system for using solar and wind energy for electricity generation and thermal regulation may be shown and described herein. The system may include a high altitude wind turbine, which may generate electric power and conduct cold to the ground and the rest of the system. The cold may be conducted to a crystallization tank, which may also include an input for heat, for example from solar energy. Cold and heat from the crystallization tank may then be stored or used to heat or cool one or more buildings.

Figure 1:
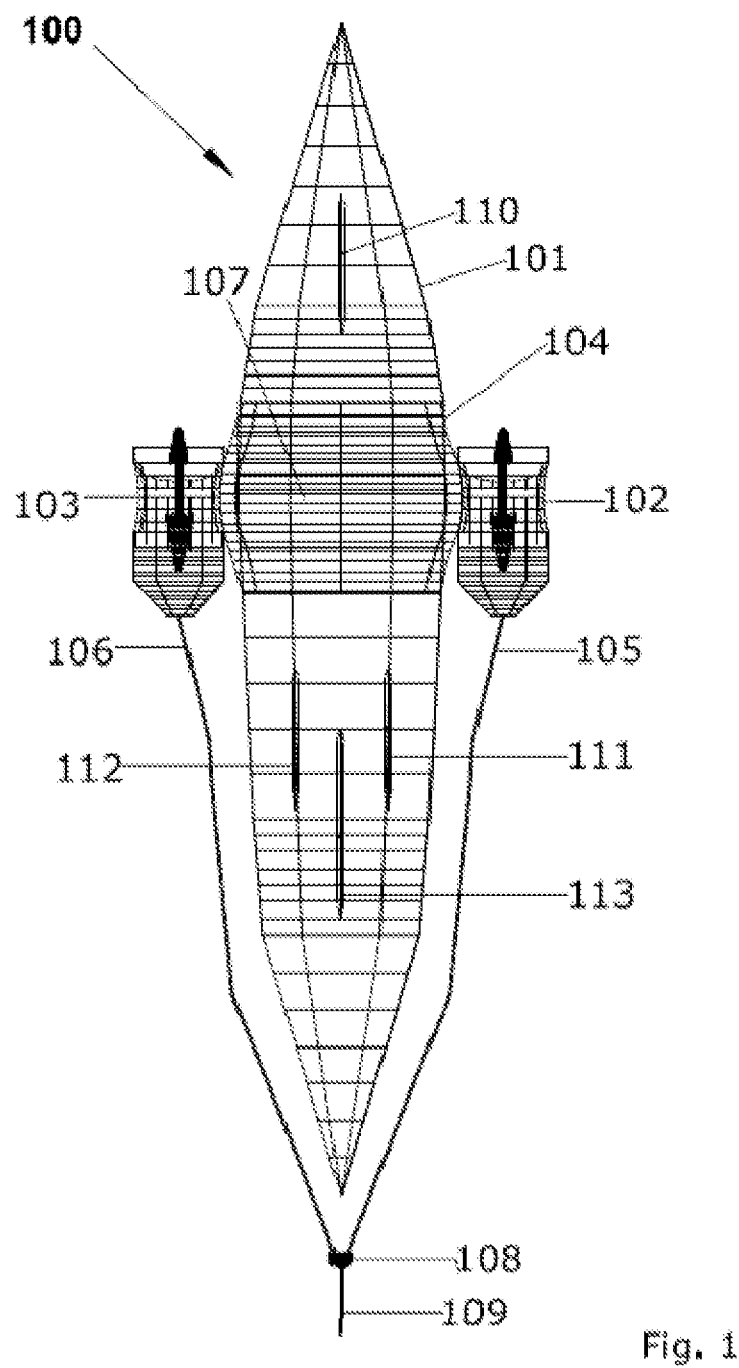
FIG. 1 shows an embodiment of a high-altitude wind turbine structure.

Referring now to exemplary FIG. 1, a high-altitude wind turbine 100 may include a shell 101, turbines 102, 103, and cables 105, 106. Shell 101 may be constructed of a relatively lightweight but also substantially rigid material, for example a carbon fiber-reinforced composite or the like, as desired. Shell 101 may have an internal chamber suitable for containing a lighter-than-air gas, such as helium, hydrogen, or any other suitable gas. Filling shell 101 with enough lighter-than-air gas may allow shell 101 to float, in a similar manner as a dirigible, and carry turbines 102, 103 to high altitudes. Turbines 102, 103 may also be constructed with a relatively lightweight but also substantially rigid material, for example in a similar manner or using similar components, as shell 101. Turbines may be affixed to shell 101 by strap 107; alternatively, the shell 101 and turbines 107 may be constructed as a single piece, or attached via an adhesive such as epoxy. Cushions 104 may be included on the sides of shell 101 to absorb excess vibrations created by turbines 102, 103. Cushions 104 may be integrally incorporated into shell 101 or constructed separately, or any combination thereof, as desired. Turbines 102, 103 may contain standard stator generators for the production of electricity, as will be explained in further detail below. Cables 105, 106 may be constructed of a conducting material, for example carbon nanotube fibers, a conductive metal like copper, or otherwise, as desired. Cables 105, 106 may conduct electricity down to the surface from turbines 102, 103. Cables 105, 106 may also conduct or otherwise transfer cold temperatures or energy from the high altitude down to the surface, as further described below.

High-altitude wind turbine (HAWT) 100 may be constructed to float at a sufficiently high altitude where it is both windy enough to generate power in turbines 102, 103 and cold enough for the use of the cold temperatures on the ground, as described below. A combined cable 109 may conduct electricity and cold down to the surface, and may also have an information relay cable, such as a fiber optic cable, or any other combination of cables or conductors, as desired. Combined cable 109 may be constructed of multiple cables or a single cable, or as desired. Further, to assist with stabilization, fins 110, 111, 112, 113 may be affixed to shell 101. In the exemplary embodiment shown here and as shown in exemplary FIG. 3, there are three fins on the bottom-side (110, 111, and 112) with one on top (113), but other configurations and numbers of stabilizing fins are also envisioned and may be used, as desired. Fins on the underside of shell 101 may additionally support HAWT 100 while it is on the ground. Fins may be designed to assist with any of a variety of properties of HAWT 100, including, but not limited to, stability while airborne, stability while on the ground, and conducting air toward the turbines 102, 103. Further, there may be, on the top of strap 107, an assembly of solar cell material, for example photovoltaic solar cells. Power generated by solar cells on strap 107 may be used by at least one motor in or operationally connected to control box 108. For example, the control box 108 may be linked to a number of propellers that may be used to move or stabilize HAWT 100, may control the orientations of fins 110, 111, 112, and 113, may be used to actuate adjustment straps linked to one or both of the above, or may control the position and/or stability of the HAWT 100 by another manner.

The exemplary structures described herein may be set up in any desired location, for example a location where commercial aircraft are not present or distant from known flight plans. However, additional safety measures may be included in HAWT 100 to detect and prevent potential collisions. Lighting, such as is found on tall buildings to warn low-flying aircraft, may be incorporated in the device (not shown). Additionally, a parachute may be incorporated (shown in exemplary FIG. 3a) to ease the descent of HAWT 100 in case of an accident or in case of the severing of combined cable 109 or any other support.

Figure 2:
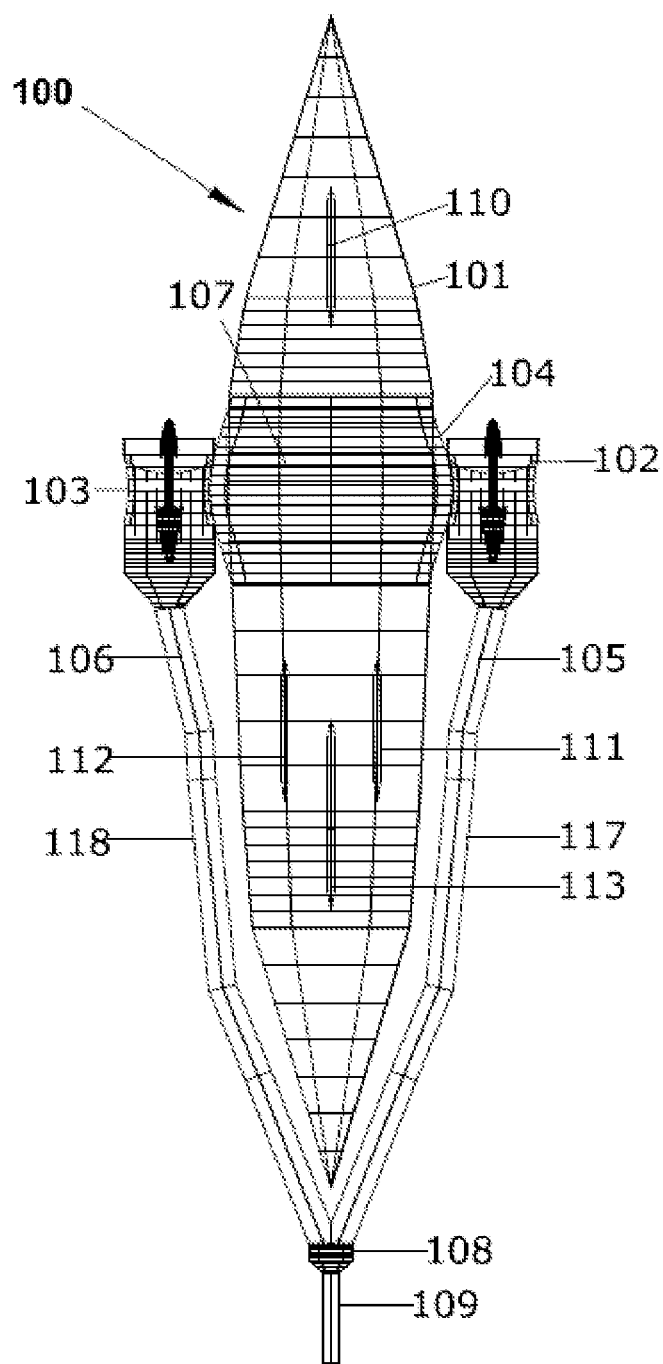
FIG. 2 shows an alternate embodiment of a high-altitude wind turbine structure.

Referring now to exemplary FIG. 2, an alternate embodiment of HAWT 100 may additionally include tubes 117, 118. Tubes 117, 118 may insulate cables 105, 106, and may join together to insulate combined cable 109 as well. Tubes 117, 118 may also provide additional physical stability, for example a physical connection between shell 101 at high altitudes and the ground. Tubes 117, 118 may be constructed out of any material or combination of materials, for example a lightweight, durable material.

Figure 2A:
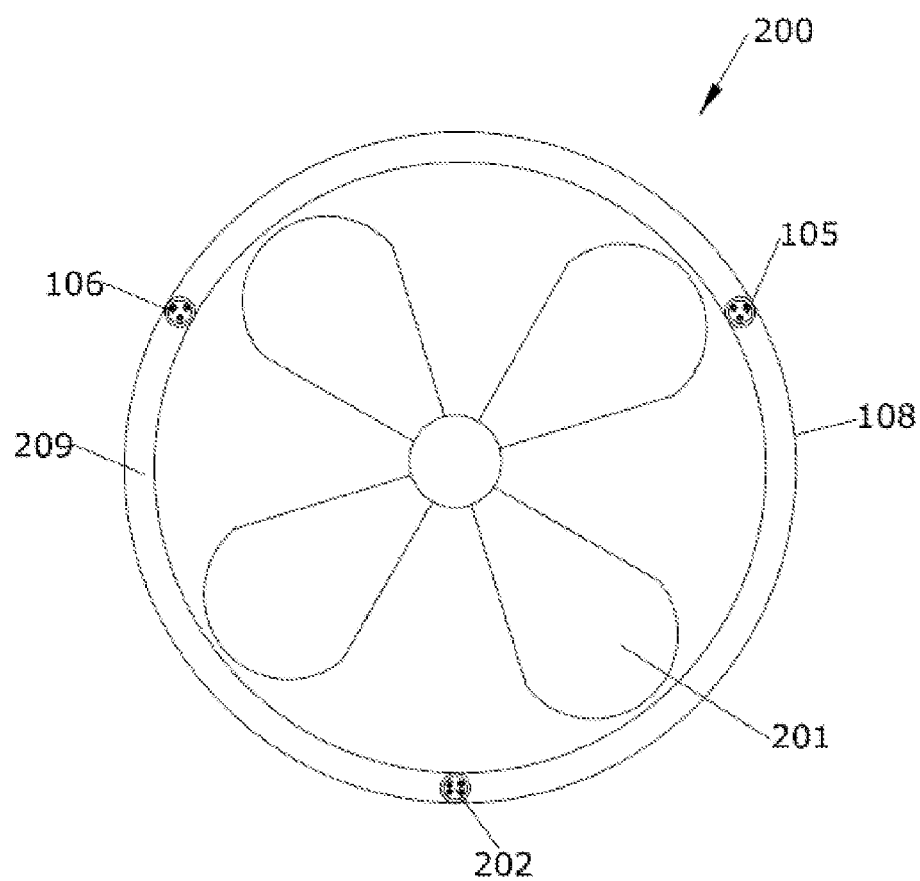
FIG. 2a shows a cross-section of a control box structure.

Now referring to exemplary FIG. 2a, control box 108 may contain a fan structure 200, shown here in cross-section. According to some embodiments, air suction fan 201 may facilitate transfer of cold from the HAWT 100 to the ground, for example by propelling air into a tube (such as the insulating tubes 117, 118, or a tube associated with combined cable 109 such as a tube in the center of the cable 109) and towards the ground. Alternatively, the system may include other manners of inducing airflow (such as a pump) or may transfer cold through a manner other than circulating air. Cables 105, 106 may pass alongside suction fan 201 before joining with combined cable 109. A communication cable 202 may also pass through fan structure 200. Communication cable 202 may be, for example, a fiber optic cable, an electrical cable, or another cable suited for transferring data. Alternatively, data transfer to and from the HAWT 100 may take place wirelessly, or by minor variations in heat or cold air transfer from the HAWT 100 (such as via pneumatic signaling). Communication cable 202 may allow for signals to be passed between HAWT 100 and a data receiver, such as a ground operator or computer. For example, a small scientific or weather station (shown as 170 in FIG. 3a) employing, for example, cameras and UV instrumentation, may be located on HAWT 100 and information may be relayed down to the ground via the communication cable 202. Additionally, information concerning turbulence and stability may be relayed to the ground, and controlling instructions may be sent to the control box 108 of HAWT 100 to re-stabilize the structure, if desired. Casing 209 may enclose and protect the various components described above. Casing 209 may be constructed of a relatively lightweight but also substantially rigid material, for example a carbon fiber-reinforced composite (CFRP) or a similar composite material. Casing 209 may also insulate the electrical and/or thermal energy being conducted through cables 105, 106. For example, Casing 209 may insulate cables 105, 106 from interfering with communication cable 202. According to at least one embodiment, casing 209 may enclose combined cable 109 as a protective or insulating tube substantially all the way to the ground. Additionally, according to one embodiment, cold may be transported through casing 209 from the high altitude of shell 101 to ground level with the assistance of suction fan 201.

Figure 3:
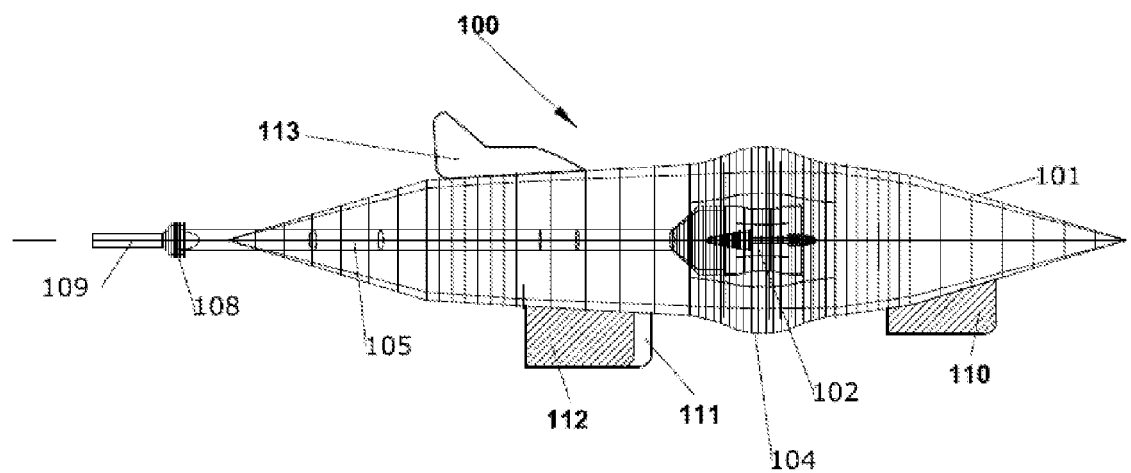
FIG. 3 shows a side profile view of a high-altitude wind turbine structure.

Exemplary FIG. 3 shows one embodiment of HAWT 100 with fins 110, 111, 112, and 113. According to the embodiment as shown, fins 110, 111, and 112 may be located on the bottom side of shell 101, allowing them to stabilize shell 101 while it is on the ground. As described above, other configurations of fins on shell 101 are also possible, as desired.

Figure 3A:
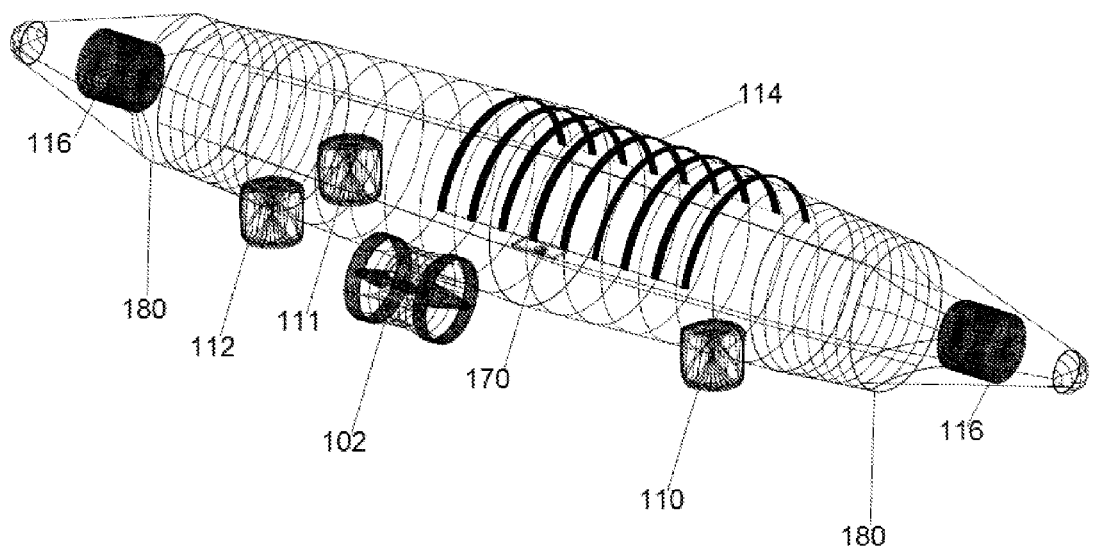
FIG. 3a shows a side axonometric view of an embodiment of a high-altitude wind turbine structure.

Exemplary FIG. 3a shows an embodiment of the HAWT 100 from a side axonometric view. The embodiment can have a solar panel 114, at least one hidden parachute 116, a release valve 180, and a small scientific or weather station 170 as discussed above. According to an exemplary embodiment, the release valve 180 may be a disc capable of swinging open or closed; an alternative release valve 180 design may also be employed. The release valve 180 may be configured to open automatically in case of damage to the HAWT 100 or to the cable 109, a collision between the HAWT 100 and another object, a mechanical fault, or another problem; the opening of the release valve may release some or all of the helium (or other gas) within the HAWT 100, causing the HAWT 100 to sink lower to the ground and facilitating its retrieval. Optionally, the parachutes 116 may also be deployed at the same time that the release valve 180 causes helium to be expelled from the HAWT 100; this may also be triggered only under certain conditions, for example if the outer shell 101 of the HAWT 100 has been punctured and the HAWT 100 is unable to control its buoyancy during its descent.

Pods 110, 111, 112 may be made of a solid but elastic material, for example a polymer, and may stay erected or elevated even if the release valve 180 is triggered and the HAWT 100 begins descending to the ground. In the event of a rough landing, the pods 110, 111, 112 may act to protect and/or contain the turbines such that the turbines are not damaged by a particularly rough landing and pose less of a threat to other objects on the ground.

Figure 4:
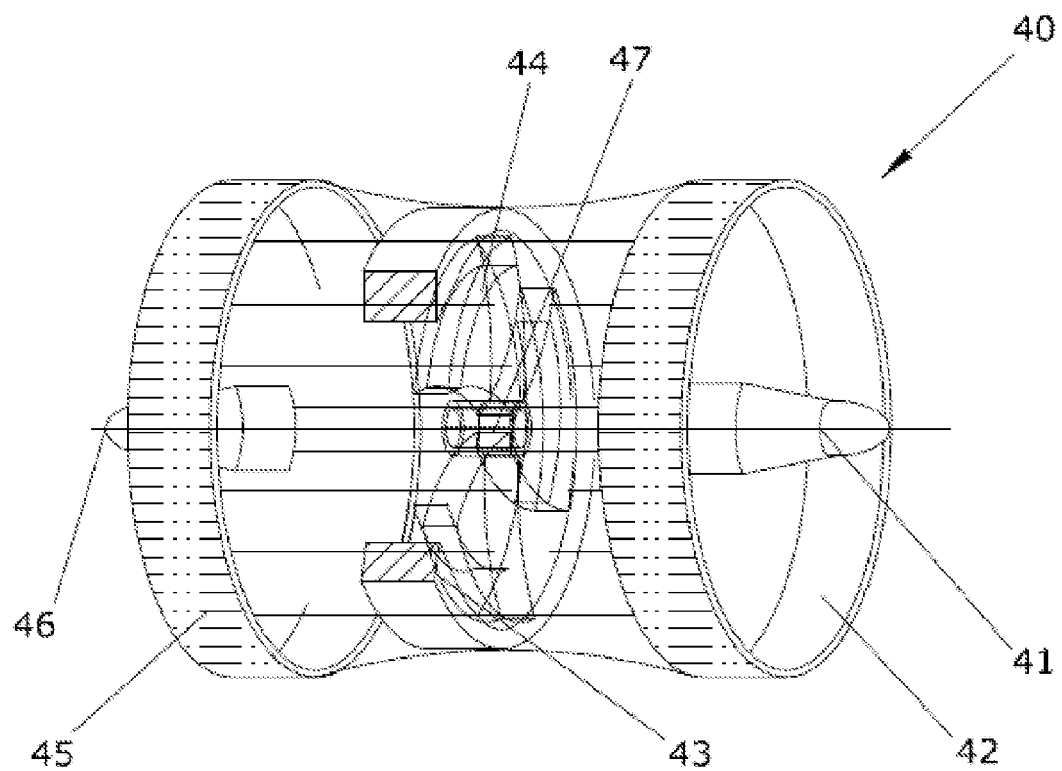
FIG. 4 shows a cutaway view of a dual-direction turbine.

Now referring to exemplary FIG. 4, a two-way power generating wind turbine 40 may be used in turbines 102, 103 (as identified in FIGS. 1, 2, 3, and 3a). Two-way turbine 40 may include an outer case 45, turbine blades 44, and a central stator magnet 43. Either end of turbine 40 may have an aerodynamic structure form 41, 46 to allow smooth passage of wind through its blades 44 in both directions in such a way that blades 44 may rotate due to wind from either direction and thus may cause shaft 47, onto which blades 44 may be fixed, to rotate inside a stator structure 47. The turbine's blades 44 may be constructed in such a way that they may rotate and generate electricity regardless of the flow direction of the wind as shown in FIG. 3a. Further, the special conical form of the turbine's casing 45 as shown in exemplary FIG. 4 may create an inward suction of air towards turbine blades 44, which may increase the efficiency of turbine 40 and which may thus increase the power generation of electrical power by HAWT 100. The turbine blades 44 and the turbine shaft 47 may be constructed as a single piece, for example form solid carbon-fiber-composite material, in order to reduce costs; according to this embodiment, the stator magnet and wires may remain separated.

Figure 4A:
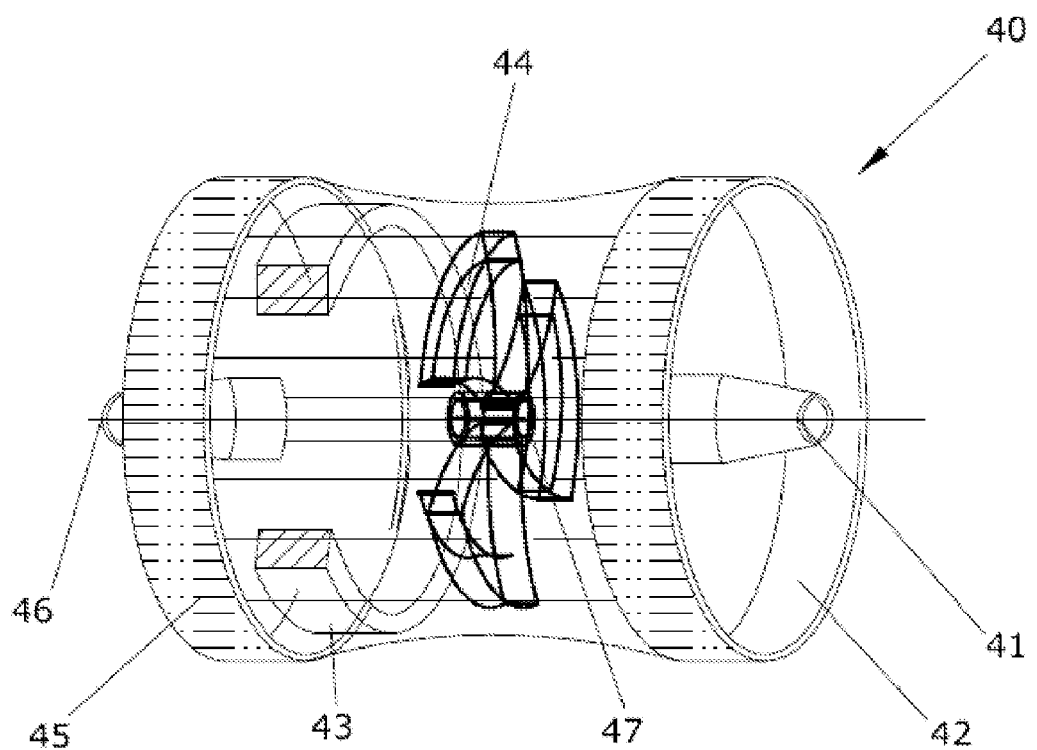
FIG. 4a shows a cutaway view of an alternate embodiment of a dual-direction turbine.

Now referring to exemplary FIG. 4a, the aerodynamic structure form 41, 46 depicted in FIG. 4 may alternatively be hollow to allow the smooth flow of air through the turbine 40, to reduce the weight of the turbine 40, or for other reasons. This may increase the overall efficiency of the turbines 40. Further, the turbine blades 44 may be constructed from lightweight material, for example carbon-epoxy-composite (CFRP). Turbine blades 44 may themselves be hollow or partially hollow, for example employing a honeycomb-like internal support structure constructed through the use of 3D printing, or may be constructed from solid material.

Figure 4B:
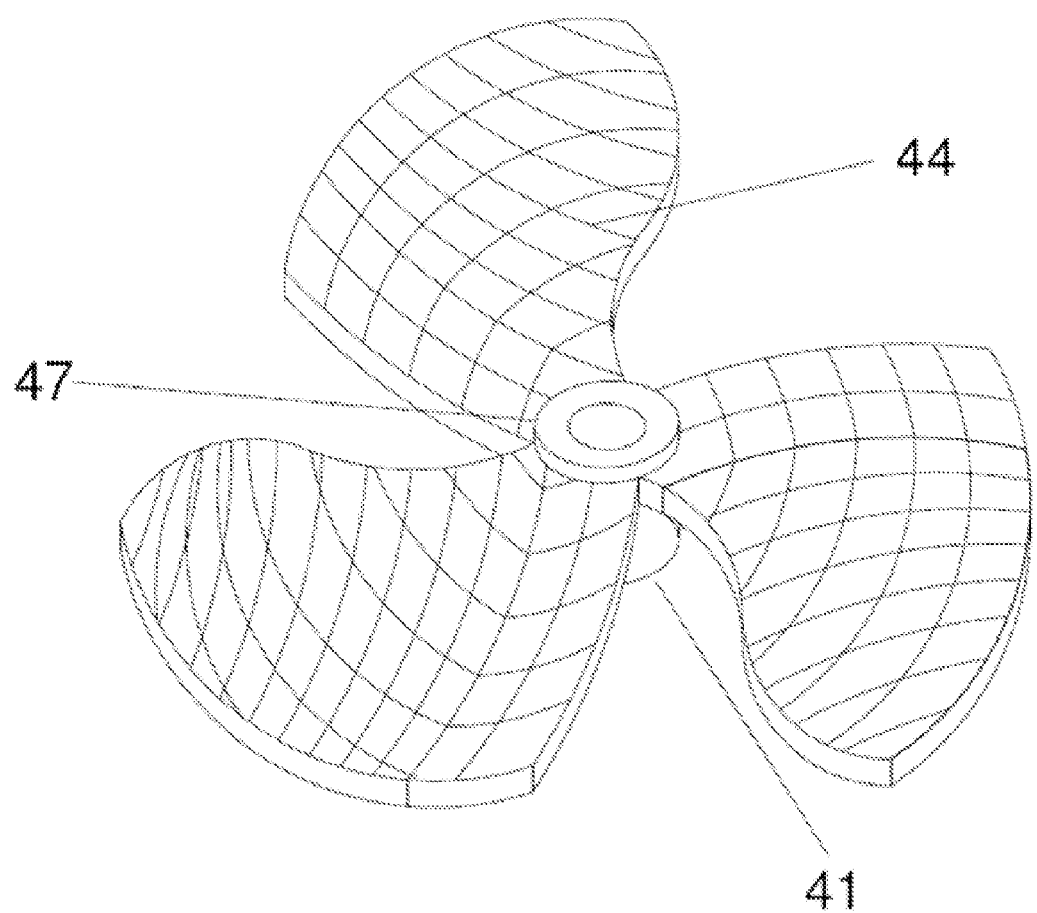
FIG. 4b shows a front view of an embodiment of a turbine rotor.

Exemplary FIG. 4b shows a front view of an embodiment of a turbine rotor assembly. The turbine rotor may be constructed from multiple sections or pieces and multiple materials, for example CFRP or balsa wood, and may be solid, hollow, or partially hollow. The turbine blades 44 may be constructed so that they may operate regardless of the direction of the wind current; this embodiment may be referred to as a "two-way" design.

Figure 4C:
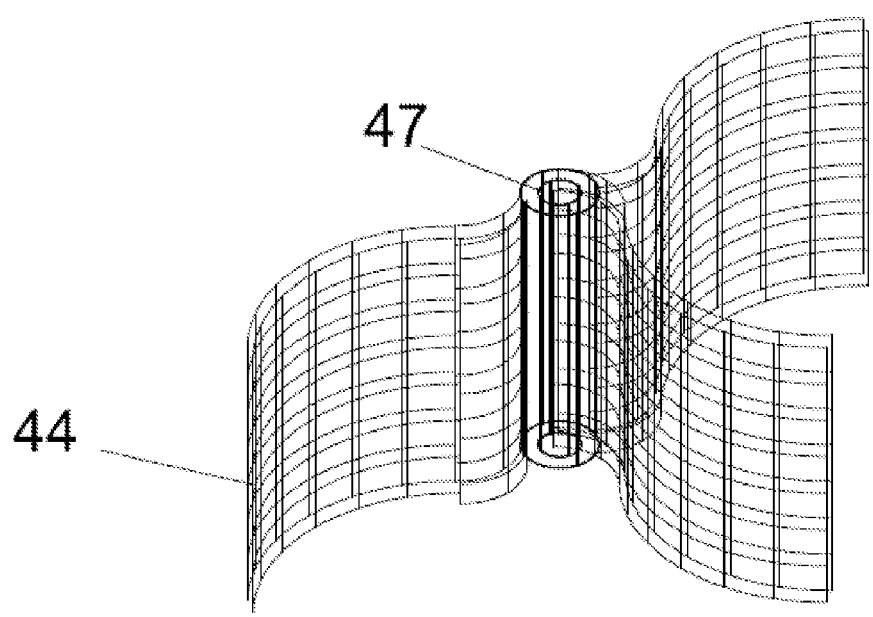
FIG. 4c shows a perspective view of an alternate embodiment of a turbine rotor.

Exemplary FIG. 4c shows an alternative design of a turbine rotor. This turbine rotor design may be used in a vertical position; the shaft of the turbine may be placed perpendicular to the direction of airflow, allowing the airflow to push on the flats of the turbine blades 44 and rotate the turbine rotor. This allows the turbine rotor to operate regardless of the direction of airflow, giving it may of the advantages of the design shown in FIG. 4b. Factors like the number of turbine blades 44, the spacing of the turbine blades 44, the surface areas of the blades 44, or the cross-sectional area of the shaft 47 may be varied in order to obtain maximum power generation. The electrical power produced by such a turbine may be governed by the equation $$P = \frac{1}{2} C_p \rho A v^3 \qquad \text{Equation 1}$$

wherein $C_p$ is the power coefficient describing the percentage of the kinetic energy in wind that the turbine is capable of extracting at a given wind speed, $\rho$ is the density of the air, A is the surface area of the turbine's blades, and v is the wind speed.

Figure 5:
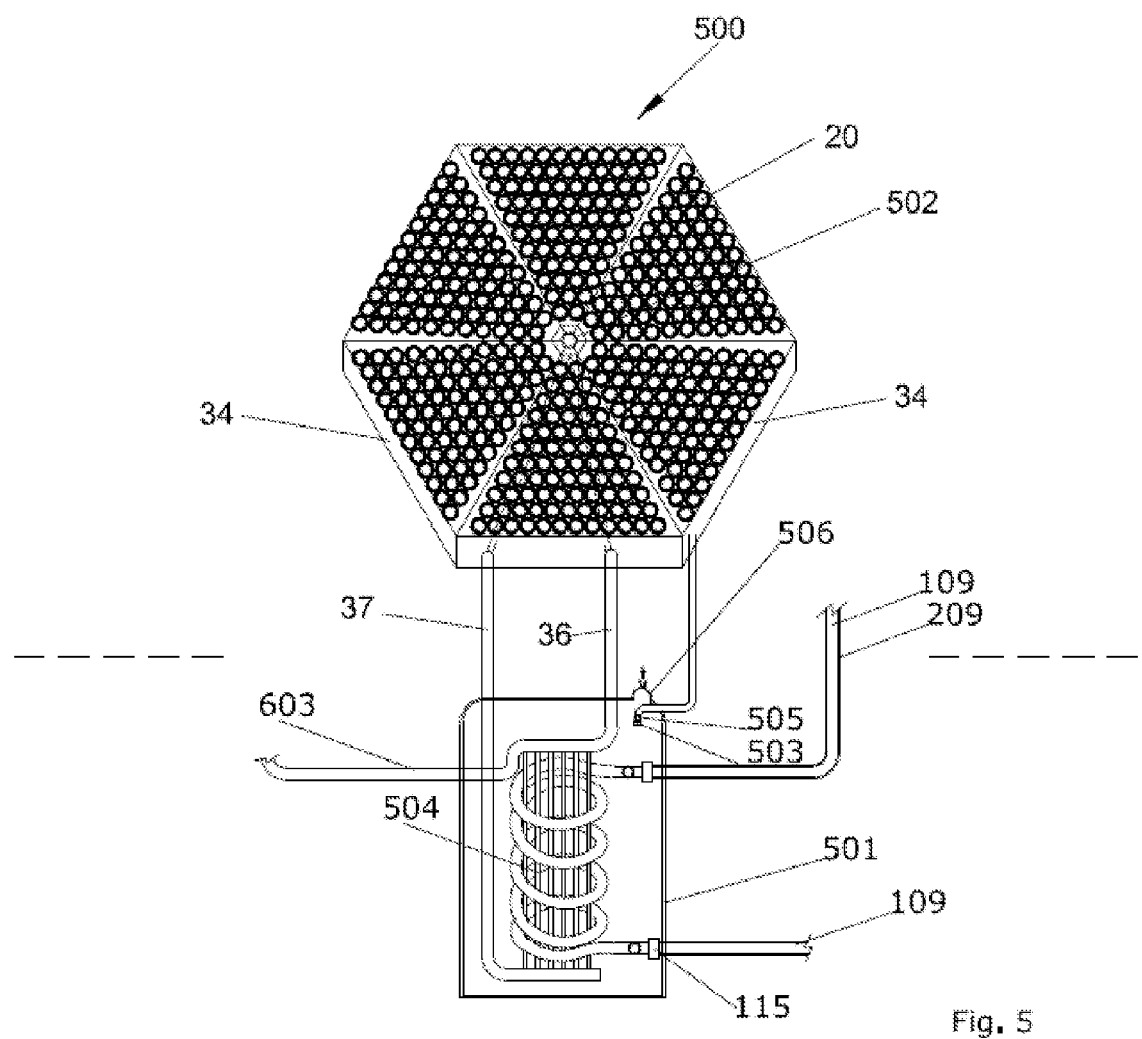
FIG. 5 shows a solar collection assembly integrated with a heat transfer system.

Exemplary FIG. 5 shows a heat transfer and solar collector assembly 500 to which HAWT 100 may be attached through combined cable 109 and/or casing 209, or as desired. The solar collection part of assembly 500 may include solar energy collection units 20, which may be described in further detail below. Energy collection units 20 may be coated in a protective film 502 to protect units 20 from dust, precipitation, or damage from any of various sources.

Cold may be transferred to the crystallization tank 501 via combined cable 109, casing 209, or both. Tank 501 may contain a temperature-storage material such as water, switchable molecules, or any other suitable material. In the case of water, for example, the cold may maintain the storage material such that there is always ice (crystallized water) in tank 501 while in use. Tank 501 may further be located underground or may be otherwise insulated from its surroundings, if desired. Sensor 115 may regulate the passage of cold into or out of tank 501, thereby regulating the temperature of tank 501.

Figure 6:
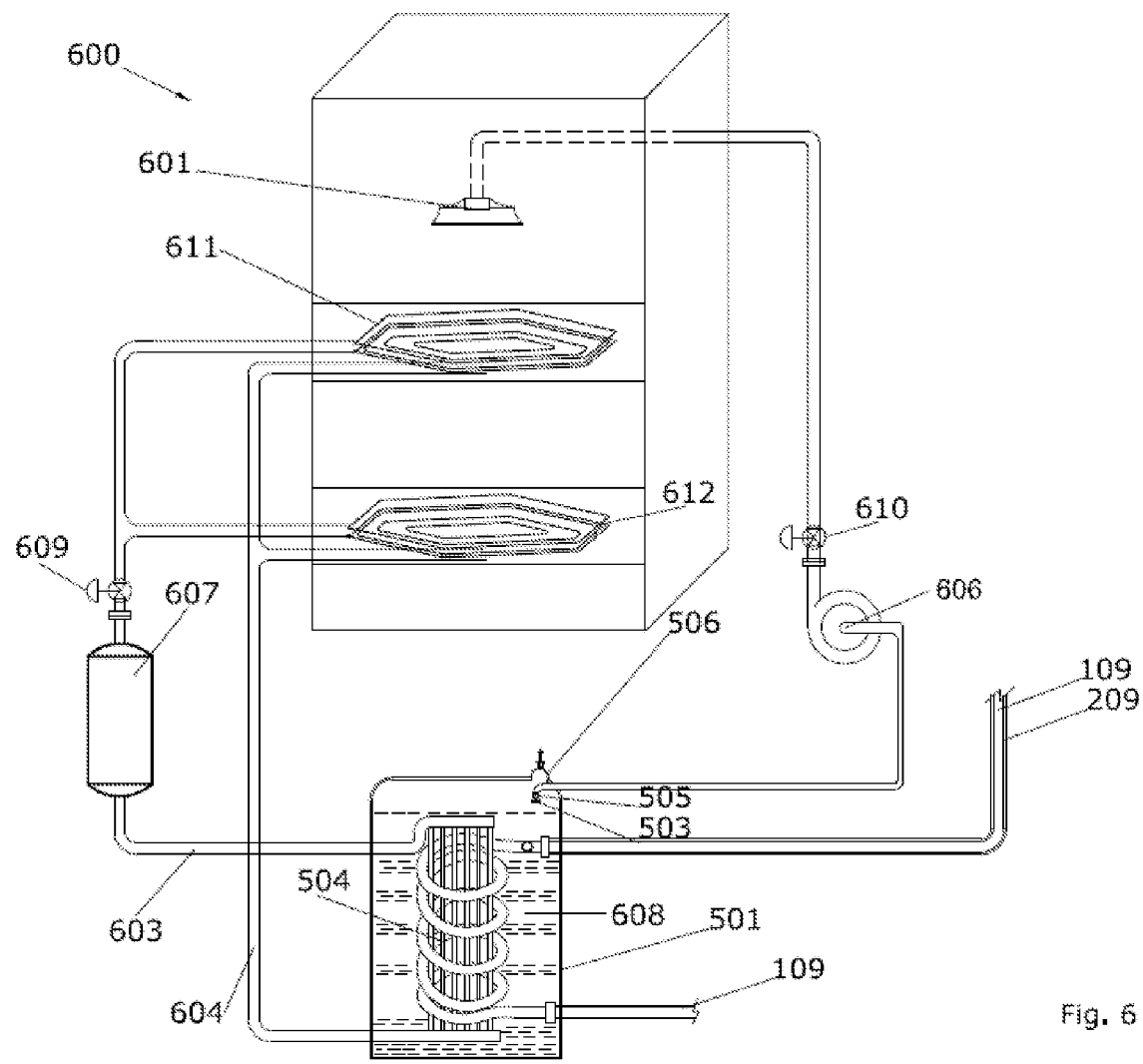
FIG. 6 shows a heating/cooling system integrated with a heat transfer system.

The crystallization tank 501 may include a heat exchanger 504. According to one exemplary embodiment, this heat exchanger 504 may include one or more sets of tubes that may permit a thermal conductor, such as thermal oil, to circulate in tank 501. The thermal oil may be heated by way of solar energy collection units 20. Tube 36 may conduct heated oil to the heat exchanger 504, and tube 37 may conduct cooled oil from the heat exchanger 504 back to collection units 20. Additionally, tube 603 may lead to a heat pump device, for example one as shown in FIG. 6 and described below.

According to an exemplary embodiment, cold air may be introduced into the heat exchanger 504 by way of a cable 109, potentially with a casing 209. This cable 109 may contain a working fluid; for example, if the cable 109 runs directly to the HAWT 100, the working fluid may be chilled air, while if the cable 109 has passed through an intermediate stage, the working fluid may be thermal oil that has been reduced to a low temperature by the chilled air circulated from the HAWT 100. In embodiments wherein the working fluid in the cable 109 is thermal oil identical in composition to the thermal oil that may circulate within the tank, the heat exchanger 504 may be of a type that employs mixing of the two working fluids; in other embodiments, the heat exchanger may be of another type, or may still employ mixing. Alternatively, the cable may be solid and contain no working fluid; in this case, the cable may conduct cold from the HAWT to the heat exchanger 504.

The heat exchanger 504 may function to add energy to the system linked to the heat pump 603. As energy in a closed system is finite, if there is no external source to replace the energy used, the system may become exhausted and may not function. Energy may be injected into the system in the form of heat or cold, and then used for either heating or cooling, as desired. In an exemplary embodiment, energy may be drawn from the system for air conditioning, and to prevent the system becoming exhausted and nonfunctional, energy will be injected into the system in the form of heat from the solar collector units 20. In an alternative embodiment, energy may be drawn from the system via a heat pump 603 and used for heating a building or other system. Energy may then be supplied to the tank 501 in the form of either heat from the solar collectors 20 from the cable 109.

Alternatively, the tank 501 may be linked to both one or more solar collectors 20 and one or more HAWT systems 100, but may only make use of the solar collectors 20 or the HAWT systems 100 to heat or cool the tank, as desired. In the event that only heating is desired (for example, if it is the middle of winter and the outside ambient temperature is very low) then the cables 109 linked to the HAWT systems 100 may be disconnected from the crystallization tank 501, leaving only the solar collectors 20 linked to the tank 501 and resulting in heat addition to the tank. In the event that only cooling is desired (for example, if it is the middle of summer and the outside ambient temperature is relatively high) then the tubes 36, 37 linked to the solar collectors 20 may be disconnected, leaving only the HAWT systems 100 linked to the tank 501 and resulting in heat loss. The heat pump system 603 may then operate to use the tank 501 as either a heat source or a heat sink for the building or other system, as desired. In the event that both heating and cooling are required (for example, the system is located within a desert that commonly experiences both very high and very low temperatures, even during different times of the same day) both the solar collectors 20 and the cables 109 linked to the HAWT systems 100 may be linked to the tank 501 and their flow controlled as desired, allowing the tank 501 to be maintained at a useful intermediate temperature for both heating and cooling or allowing the temperature of the tank 501 to be dynamically shifted based on anticipated need.

Alternatively, separate tanks 501 may be linked to the solar collectors 20 and to the HAWT systems 100 and may be isolated from each other. In such an embodiment, at least one dedicated "cold" crystallization tank 501 may be linked only to the HAWT systems 100 and maintained at a temperature colder than the ambient temperature, and at least one dedicated "hot" crystallization tank 501 may be linked only to the solar collectors 20 and maintained at a temperature warmer than the ambient temperature. The use of dedicated "hot" and "cold" tanks 501 may allow for more efficient thermal storage; for example, if one tank 501 is to be maintained at about 0° C., or in a range of about 0° C. to about −50° C., and the other tank 501 is to be maintained at 200° C., appropriate phase-change materials that undergo changes of state near those temperatures may be selected to fill the tanks 501, allowing each to store thermal energy more efficiently. The use of multiple tanks 501 also allows for a heat pump system 603 to conduct heat either away from the building into the "cold" tank 501 or into the building from the "hot" tank 501, or both, or neither, as desired. Alternatively, working fluid from either of the "hot" and "cold" tanks 510 may be directly circulated throughout the building without the use of a heat pump 603 or in addition to the use of a heat pump 603.

As an alternative to delivering cold air to the ground via a cable 109, cold air may instead be delivered via casing 209. If cold air is delivered to the ground via casing 209, the cold air may be used directly to cool one or more buildings, thus saving on the expense of electricity for a compressor unit, typically the largest pull of electricity in an A/C system. Also, valve 505 may allow some quantity of cooled air to pass through filter 503 and up into chamber 34, located under solar collection units 20. Chamber 34 may thus, through circulating cooled air, cool the underside of solar collection units 20, if desired.

Figure 5A:
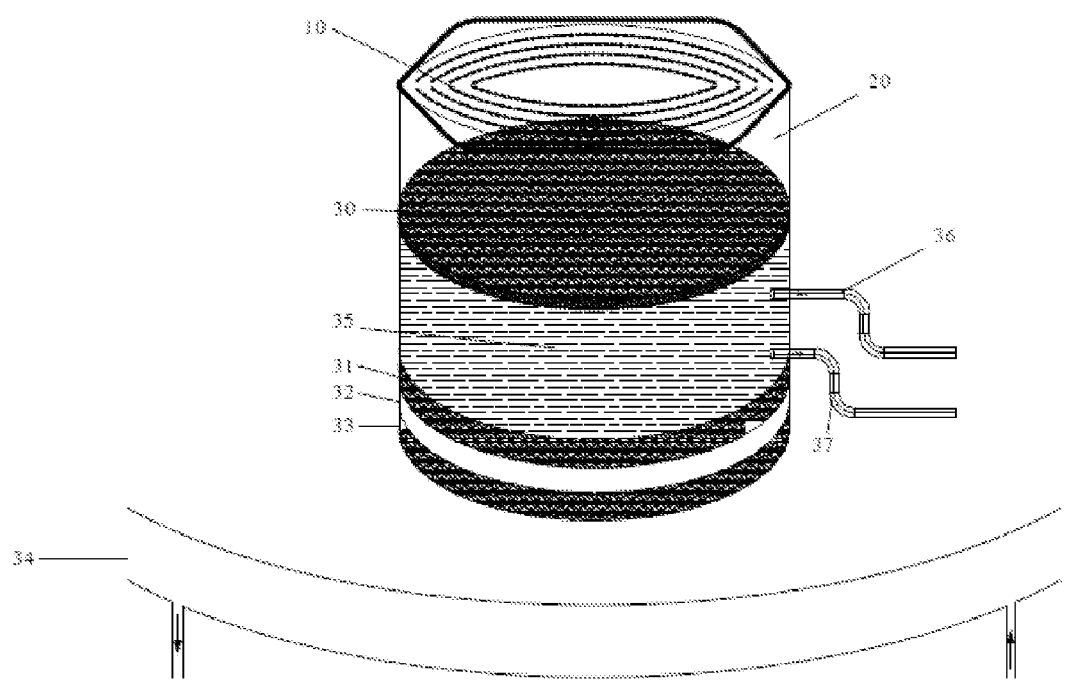
FIG. 5a shows a solar energy collection unit.

Exemplary FIG. 5a shows a solar collection unit 20 in further detail. Solar collection unit 20 may include a lens 10, a thermal container 35, and a thermocell structure at the bottom of collection unit 20. Lens 10 may be as thick or as thin as desired for a particular application. Concentrating lens 10 may further be constructed of an acrylic thin-film material, or as desired. Lens 10 may further be constructed of a multiple-micro-lens material. According to one non-limiting example, lens 10 may be constructed of an acrylic thin-film material with a thickness of approximately 0.3175 cm. Additionally, lens 10 may be colored or colorless, as desired, for example to enhance the aesthetic quality of the overall structure, and/or lens 10 may be in any shape, for example a hexagonal shape. Lens 10 may concentrate solar energy onto the top of thermal container 35. A layer 30 of absorbing material may be disposed on top of thermal container 35 to assist with heat absorption, if desired. For example, a dark colored material, for example carbon nanotubes, may be used as a part or whole of absorbing layer 30. Thermal container 35 may contain a thermally conductive fluid, such as thermal oil, which may circulate in and out of thermal container 35 by way of tubes 36 and 37, as described above.

Figure 5B:
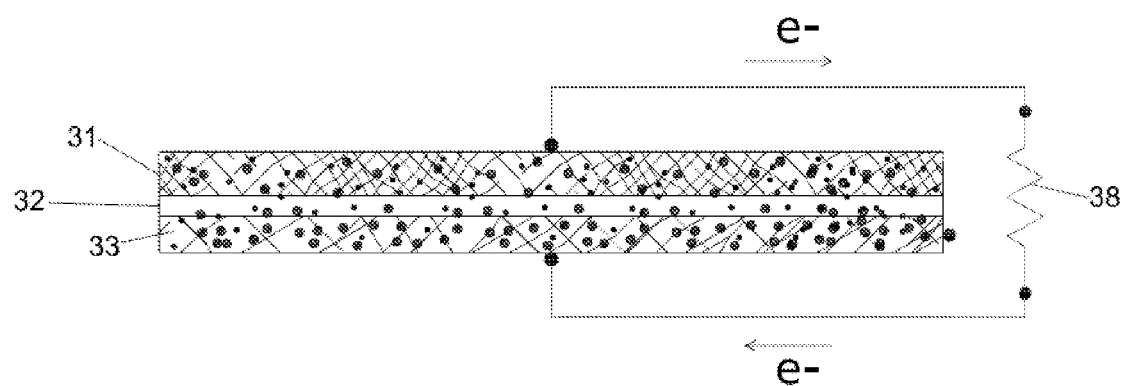
FIG. 5b shows a schematic diagram of a thermocell.

Referring now to exemplary FIGS. 5a and 5b, a thermocell structure may be disposed on the bottom side of collection unit 20. The thermocell structure may include a heated layer 31, an insulating layer 32, and a cooled layer 33. The thermocell may generate an electric current through thermoelectricity. For example, the thermally conductive fluid in thermal container 35 may be very hot and may heat heated layer 31. Cooled layer 33 may be situated adjacent to chamber 34, which may cool cooled layer 33 as shown in exemplary FIG. 5 and described above. The temperature gradient between layers 31, 33 may then enable the generation of a current. The electric power generated by the thermocell may be stored in a battery, used directly, or as desired. The equation for determining the potential thermoelectric energy created by thermocell 10 is:

$$V = a(T_h - T_c)$$ Equation 2 where V is the voltage produced, a is the Seebeck coefficient of the thermocell, $T_h$ is the temperature of the hot electrode, and $T_c$ is the temperature of the cold electrode.

Exemplary FIG. 5b illustrates the thermoelectric energy generation of the thermocell structure. Heated layer 31 and cooled layer 33 may be constructed of the same or different materials to generate the thermoelectric effect. For example, plates 31, 33 may be constructed of different compositions of carbon nanotube materials. The current 38 produced can then be stored or used to do work.

Now referring to exemplary FIG. 6, a heating and cooling system 600 for a building may be integrated with the solar collector assembly 500 as shown in exemplary FIG. 5 and described above. For simplicity and clarity, solar collection assembly 500 is not shown here.

Heating and cooling system 600 may make use of crystallization tank 501, which may be substantially the same as is shown in exemplary FIG. 5 and described above. Crystallization tank 501 may contain a temperature-storage material 608 such as water, switchable molecules, or any other suitable material. Cold air, either directly from casing 209 or cooled by temperature-storage material 608 in tank 501, may pass through filter 503 and valve 505 to pump 606. Pump 606 may have a sensor/valve structure 610 which may only open when the air is sufficiently cold. Pump 606 may pump cooled air to an air conditioning device 601 inside of one or more buildings or as desired.

A heated thermally conductive fluid may also be used to heat one or more buildings in heating and cooling system 600. The heated fluid may be heated, for example, by connecting solar collector assembly 500 (not shown). The heated fluid may pass through tube 603 to a heat pump 607. Heat pump 607 may then pump heated fluid through valve 609 and into one or more buildings. According to at least one embodiment, the heated fluid may pass through a radiating system, for example in-floor heating tubes 611, 612. Once used, the fluid may then return to crystallization tank 501 through tube 604 for storage or reheating, as desired.

Referring generally to exemplary FIGS. 1-6, a system for using solar and wind energy for electricity generation and thermal regulation may be described and shown. The system may include a high altitude wind turbine 100, which may generate electric power and conduct cold to the ground and the rest of the system. The generated power may be stored in a battery, used immediately, or as desired. The cold may be conducted in the form of direct conduction via a cable 109 or may be transferred in the form of cold air travelling through casing 209. The cold may be conducted to crystallization tank 501.

Crystallization tank 501 may have an input for cold from HAWT 100 and an input for heat from solar collection assembly 500, and may allow for heat transfer between the supplied cold, the supplied heat, and a temperature-storage material 608. Cold air in crystallization tank 501 may be used to cool a building via pump 606. A heated thermal fluid may be used to warm a building via heat pump 607. Solar collection assembly 500 may also produce additional electric power in solar collection units 20 by way of thermoelectric processes.

The described system for using solar and wind power for electricity generation and thermal regulation may significantly conserve both electricity production and usage. Because the electricity may be produced in loco, consideration for losses due to long-distance transmission can be effectively ignored. Additionally, because the heating and cooling may themselves be produced by natural and passive processes, the significant amount of energy otherwise needed to heat or cool a building can be substantially decreased.

Other advantages, such as the ability to install a small weather station on the high-altitude structure, the minimal cost regarding aesthetics, the ability to adjust the height and/or positioning of the turbines to achieve better results given a certain set of meteorological conditions, and the high expected output from the turbine generators due to wind energy density being higher at high altitudes are also envisioned.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A high-altitude wind turbine, comprising:
   a substantially rigid shell;
   a chamber that retains a quantity of lighter-than-air gas to lift the high-altitude wind turbine off of the ground when substantially filled with said lighter-than-air gas;
   at least one wind turbine that generates a quantity of electrical power when spun by an airflow; and
   an electrically conductive cable that tethers the high-altitude wind turbine to an anchor point, wherein the electrically conductive cable is surrounded by an insulated casing and wherein the insulated casing permits a quantity of airflow from the high-altitude wind turbine to the anchor point.

2. The high-altitude wind turbine of claim 1, further comprising a thermally conductive cable that tethers the high-altitude wind turbine to an anchor point.

3. The high-altitude wind turbine of claim 1, wherein the high-altitude wind turbine includes a weather station.

4. The high-altitude wind turbine of claim 3, further comprising a communication cable operationally linked to the weather station.

5. The high-altitude wind turbine of claim 1, further comprising a solar panel mounted on the rigid shell.

6. The high-altitude wind turbine of claim 1, further comprising a release valve operationally linked to the chamber suitable for retaining a sufficient quantity of lighter-than-air gas, and wherein the release valve may be actuated to release a quantity of lighter-than-air gas into the atmosphere.

7. The high-altitude wind turbine of claim 1, further comprising at least one parachute configured to deploy under preset conditions.

8. A system for using solar and wind energy for thermal regulation, comprising:
   at least one high-altitude wind turbine;
   at least one solar collector;
   at least one crystallization tank operationally linked to both the at least one high-altitude wind turbine and the at least one solar collector; and at least one heat pump configured to conduct heat between the at least one crystallization tank and another environment.

9. The system of claim 8, wherein heat is added to the at least one crystallization tank via a linkage to the at least one solar collector.

10. The system of claim 8, wherein heat is removed from the at least one crystallization tank via a linkage to the at least one high-altitude wind turbine.

11. The system of claim 8, wherein the combination of the at least one high-altitude wind turbine and the at least one solar collector generates a quantity of electrical power.

12. The system of claim 8, wherein cold air is delivered from the at least one high altitude wind turbine to an air conditioning unit.

13. The system of claim 8, wherein there are separate and distinct at least one crystallization tanks for hot thermal storage and cold thermal storage.

14. A method for using solar and wind energy for thermal regulation, comprising:
  delivering heat to a system by at least one solar collector;
  delivering cold to a system by at least one high-altitude wind turbine;
  combining the at least one solar collector and the at least one high-altitude wind turbine to produce a thermal reservoir at a desired temperature; and
  directing, with a heat pump, heat between the thermal reservoir and an environment to be thermally regulated to bring the environment to be thermally regulated to a desired temperature.

15. The method of claim 14, wherein the solar collector generates a quantity of electrical power.

16. The method of claim 14, wherein the high-altitude wind turbine generates a quantity of electrical power.

17. The method of claim 14, further comprising taking atmospheric measurements and transmitting the atmospheric measurements to a data receiver.

18. The method of claim 14, further comprising deploying a parachute in response to a sudden descent of the high-altitude wind turbine.

* * * * *